United States Patent Office 3,274,121
Patented Sept. 20, 1966

3,274,121
TRILITHIUM PHOSPHATE ISOMERIZATION CATALYST
Gerard Schneider, Caluire, Rhone, France, assignor to Progil, Paris, France, a society
No Drawing. Filed Sept. 9, 1963, Ser. No. 307,322
Claims priority, application France, Sept. 12, 1962, 909,208
5 Claims. (Cl. 252—437)

The present invention relates to an improved isomerization catalyst, intended particularly for the isomerization of alkylene oxides.

Trilithium phosphate ($Li_3PO_4$) is known to be a particularly active catalyst for the isomerization of certain alkylene oxides, and especially of propylene oxide, to the corresponding alcohols; this catalyst, which has the advantage over other catalysts of giving better rates of transformation and yields of alcohol, has been the subject of various researches; it has thus been modified to render it more active, especially by including in the trilithium phosphate 0.05 to 1% by weight of an alkaline base. However, even with this known improved form of trilithium phosphate catalyst, it is scarcely possible to obtain a higher yield than 85% and a rate of transformation of the order of 40%. The hourly production obtained per kg. of catalyst with this known improved catalyst does not exceed 500 g. of allyl alcohol in the isomerization of propylene oxide in the gaseous phase.

The catalyst of the present invention is based on trilithium phosphate but is still further improved, so that with its aid it is possible to attain transformation rates of 45 to 65% with yields exceeding 90% and the production of more than 1 kg., even 1.5 kg. of alcohol per kg. of catalyst per hour.

The improved catalyst of the invention consists of trilithium phosphate containing a small excess of lithium with respect to $P_2O_5$, such that the ratio of the number of atoms of lithium to the number of atoms of phosphorus is between 3.06 and 3.7, instead of the figure of 3 which corresponds to the formula $Li_3PO_4$.

It is particularly preferred that the Li:P ratio should be between 3.1 and 3.3.

Another preferred feature of the catalyst of the invention is that it is fine-grained; the best results being obtained when the elementary granules have a mean size of 1 to 100 microns, and preferably 1 to 40 microns; the choice of dimensions between 1 and 10 microns gives a particularly active catalyst.

The invention also relates to a process for the preparation of the improved catalyst, which consists in mixing an aqueous solution of a lithium compound with an aqueous solution of orthophosphoric acid or a soluble orthophosphate such that the pH of the resulting mixture is between 7 and 14 as rapidly as possible and in any case within 5 minutes, and then separating the lithium phosphate precipitated.

It is preferred that the mixing of the two solutions should be carried out in less than 1 minute, and the best results are obtained when the mixing takes only 10 to 40 seconds. The precipitation is preferably carried out in a medium of pH between 12 and 14.

The precipitate obtained is then washed with water so as to remove excess of compounds other than lithium and $P_2O_5$.

For the preparation of the catalyst, the lithium solution can be a solution of lithium hydroxide or lithium nitrate, sulfate, chloride, bromide, iodide, chlorate, perchlorate, acetate, or any other soluble lithium salt, and the phosphate solution can be a solution of sodium, potassium or ammonium orthophosphate or orthophosphoric acid. The solution of the lithium salt is rendered sufficiently alkaline by the addition of a hydroxide in which the phosphate is soluble, such as sodium or potassium hydroxide. This is particularly necessary when the phosphoric solution is acid since without this pH adjustment, the trilithium phosphate which precipitates is catalytically inactive.

Inasmuch as the solubility in water of trilithium orthophosphate is very slight, the above solutions, used for the precipitation of it, may have very largely variable concentrations. Particularly convenient concentrations are: for the lithium compound solutions 2 to 6 Li gram-atoms per liter and even better 3 to 4; for the soluble phosphate or phosphoric acid solutions 0.5 to 1.5 $PO_4$ moles per liter and preferably 0.8 to 1.0.

The temperature of the solutions at their moment of mixing can vary widely, for example from 0° to 100° C., and in practice between 15° and 80° C.

The feature of the process which particularly influences the fineness of the granules produced is the rapidity with which the two solutions are brought into contact, which has been mentioned above. Thus the shorter the duration of the contact period the finer and the more active are the crystals produced.

After precipitation of the lithium phosphate as described above, the two liquids are separated by filtration, centrifuging or other known means; the precipitate is washed thoroughly either on the filter or by taking it up in a sufficient quantity of water, so as to eliminate all soluble excess of the alkaline hydroxide added initially. The precipitate obtained is then dried, for example for several hours at 120° to 130° C.

The catalyst according to the invention can be used in carrying out different isomerizations of alkylene oxides by known processes. It is particularly advantageous to use it in the manufacture of allyl alcohol from propylene oxide, in which process it gives excellent yield and prevents the formation of much propionaldehyde or acetone, the amounts of which formed become very slight.

These favorable results are obtained when the catalyst is used in an isomerization process in which the catalyst is suspended in an inert liquid whch passes through the alkylene oxide vapors to be isomerized. Such a liquid can consist of a hydrocarbon of molecular weight above 120, selected from aromatic and aliphatic hydrocarbons, cyclanes and cyclenes; preferred materials are diphenyl oxide, the diphenyl benzenes, dodecyl benzenes and other heavy alkyl benzenes.

There are described below some non-limiting examples of the preparation of catalysts according to the invention, in which there are indicated the activity of the catalysts by means of the rate of transformation, productivity and yield to which they lead. These figures have been determined in each case by the preparation of allyl alcohol from propylene oxide, the catalyst being suspended in a mixture of ortho, meta and para terphenyls, melting at 45° C., as the inert auxiliary liquid.

In each preparation, the fresh propylene oxide was stored in a vessel from which it was passed to a preheater at a predetermined rate by means of a volumetric pump. The preheater was a simple tube heated electrically. The propylene oxide vapor thus preheated was passed into the bottom of a reactor, which was a cylindrical tube 50 mm. in diameter and 5 m. high, which could thus hold about 500 ml. of an intimate mixture of powdered catalyst and auxiliary liquid. 80 g. of catalyst was maintained in suspension in the auxiliary liquid by agitation due to the passage of the bubbles of propylene oxide vapor.

Except in Example 3, the charge of propylene oxide was 200 g. per hour, that is to say 250 g. per 100 g. of catalyst per hour. The temperature in the reactor was maintained at 275° C. with the exception of Example 8, in which it was 280° C.

On leaving the reactor, the vapors derived from the auxiliary liquid were condensed, separated from the vapors of the reaction mixture and recycled into the reactor. The vapors of the reaction products were then condensed and recovered in another vessel having a vent connected to the atmosphere by means of a refrigerator in which a liquid at about −17° C. circulated; the liquid product recovered was analyzed and the rate of transformation, i.e., the yield of allyl alcohol with respect to the propylene oxide used, was determined.

The above operating conditions were chosen arbitrarily; it is, however, to be understood that the process of the invention can be carried out under other conditions, especially as regards the hourly charges of alkylene oxide, proportions of catalyst, and temperature; the latter may vary, for example, from 180° to 400° C. Advantages can result from modification of these factors, especially increase in the propylene oxide charge per unit weight of catalyst, which can give a higher productivity as shown in Example 3.

By the term "productivity" is meant the quantity of alcohol in kg. produced per kg. of catalyst per hour. There generally exists for this figure an optimum value which does not necessarily correspond with the highest conversion rate.

*Example 1*

A solution was made by dissolving 132 g. of lithium hydroxide monohydrate, i.e., 3.14 moles, in 750 ml. of distilled water, to which 43 g. of pure sodium bicarbonate was then added. Another solution was made by dissolving 380 g. of sodium orthophosphate $Na_3PO_4.12H_2O$, i.e. 1 mole, in 1250 ml. of distilled water. The phosphate solution was added to the lithium solution in 40 seconds, at a temperature of 20° C.

The precipitate obtained was filtered and left to drain; it was then washed on the filter continuously with 3 liters of distilled water. The catalyst obtained was powdered, and then dried for a few hours at 120 to 130° C.; it was then in the form of a fine powder having a mean size of 1 to 5 microns.

Analysis of the powder showed a Li/P atomic ratio of 3.22.

The catalystic activity determined by the method indicated above for a propylene oxide charge of 200 g. per hour gave a rate of conversion of propylene oxide of 51% and a yield of allyl alcohol of 93%. The productivity amounted to 1.18 kg. of allyl alcohol per kg. of catalyst per hour.

Under the same operating conditions, the best catalyst hitherto known facilitated a productivity of only about 0.9 kg. per kg. of catalyst per hour.

*Example 2*

The catalyst was prepared in a similar manner to that described in Example 1, but the duration of the precipitation was 50 seconds. Furthermore, after the first filtration the precipitate was taken up and suspended 4 times successively in 1500 ml. of distilled water.

Analysis showed the Li/P atomic ratio to be 3.19.

A trial preparation of allyl alcohol gave a conversion of 54%, a yield of 92%, and a productivity of 1.23 kg. per kg. of catalyst per hour.

*Example 3*

The catalyst was prepared as in Example 1. In the trial preparation the charge of propylene oxide was 340 g. per hour, i.e. 425 g. per 100 g. of catalyst per hour, the other conditions being unchanged.

There was thus obtained a conversion rate of propylene oxide of 47% with a yield of 92.5% of allyl alcohol, the productivity being 1.48 kg./kg./hour.

*Example 4*

A catalyst was prepared by adding an aqueous solution of 10% phosphoric acid to a lithium solution during a 60-second mixing period. The first of these solutions consisted of 232 g. of phosphoric acid of density 1.685, i.e. 2 moles of $H_3PO_4$, in 2 liters of distilled water. The second solution consisted of 306 g. of lithium hydroxide monohydrate, i.e. 7.3 moles of LiOH, in 2 liters of distilled water. The precipitation occurred at 75° C.; the precipitate was washed with 6 liters of distilled water, then dried by heating at 120° to 130° C.

The Li/P atomic ratio was 3.28.

The test of the catalytic activity gave a conversion rate of 49%, a yield of allyl alcohol of 91.5% and a productivity of 1.02 kg./kg./hour.

*Example 5*

The catalyst was prepared in a similar manner to that of Example 1, but the addition of the sodium phosphate solution to the lithium hydroxide solution took 60 seconds instead of 40. After drying, the Li/P ratio was found to be 3.06. The size of the elementary granules was about 20 to 40 microns.

The test of the catalytic activity gave a conversion rate of 20% and a yield of 90% of allyl alcohol. The productivity was 0.45 kg./kg./hour.

*Example 6*

3 moles of lithium nitrate were dissolved in 1000 ml. of distilled water; 4 moles of sodium hydroxide were added to this solution. A sodium phosphate solution was prepared with 380 g. of $Na_3PO_4.12H_2O$ in 1250 ml. of distilled water. This solution was added within 25 seconds to the lithium nitrate solution, the precipitation temperature being 63° C. The washing was carried out as in Example 1.

Analysis of the product showed an Li/P ratio of 3.3. The trial preparation of allyl alcohol gave a conversion rate of 58%, a yield of 94% and a productivity of 1.36 kg./kg./hour.

*Example 7*

The preparation of the catalyst was similar to that of Example 6, carried out rapidly in 25 seconds, but to the lithium nitrate solution was added only 0.15 moles of sodium hydroxide in place of 4 moles, which gave a mixed solution of pH about 7.3.

Analysis of the product showed an Li/P ratio of 3.06. The preparation of allyl alcohol gave a conversion rate of 33%, a yield of 91% and a productivity of 0.75 kg./kg./hour.

*Example 8*

The operation of Example 6 was repeated, but during the trial preparation to test the activity of the catalyst the reaction mixture was maintained at 280° C. instead of 275° C. The conversion rate was 60%, the yield 92.5% and the productivity 1.44 kg./kg./hour.

The following table summarizes the conditions used and the results contained in the examples.

| Example No. | 6 | 8 | 4 | 1 | 3 | 2 | 5 | 7 |
|---|---|---|---|---|---|---|---|---|
| Li/P ratio | 3.3 | 3.3 | 3.28 | 3.22 | 3.22 | 3.19 | 3.06 | 3.06 |
| Precipitation time (seconds) | 25 | 25 | 60 | 40 | 40 | 50 | 60 | 25 |
| Catalyst trial: charge of propylene oxide (g./h.) | 200 | 200 | 200 | 200 | 340 | 200 | 200 | 200 |
| Temperature (° C.) | 275 | 280 | 275 | 275 | 275 | 275 | 275 | 275 |
| Conversion rate of propylene oxide (percent) | 58 | 60 | 49 | 51 | 47 | 54 | 20 | 33 |
| Yield of allyl alcohol (percent) | 94 | 92.5 | 91.5 | 93 | 92.5 | 92 | 90 | 91 |
| "Productivity" (kg. alcohol/kg. catalyst/hour) | 1.36 | 1.44 | 1.02 | 1.18 | 1.48 | 1.23 | 0.45 | 0.75 |

I claim:
1. A catalyst for promoting the isomerization of alkylene oxides to corresponding alcohols, which comprises granules of trilithium orthophosphate having a lithium to phosphorus atomic ratio of from 3.1 to 3.3.
2. A catalyst for promoting the isomerization of propylene oxide to allyl alcohol, which comprises granules of from 1 to 10 micron sizes of trilithium orthophosphate having a lithium to phosphorus atomic ratio of from 3.1 to 3.3.
3. A process for preparing a trilithium orthophosphate catalyst, having a lithium to phosphorus atomic ratio of from 3.1 to 3.3, which comprises:
   (a) mixing, within less than one minute, an aqueous solution of a water-soluble lithium compound with an aqueous solution of sodium orthophosphate, potassium orthophosphate, ammonium orthophosphate, or orthophosphoric acid;
   (b) maintaining the pH of the resulting mixture between 7 and 14, and its temperature between 0° and 100° C., to precipitate said trilithium orthophosphate catalyst;
   (c) separating the precipitate thus formed from said mixture;
   (d) washing the precipitate with water; and
   (e) drying the fine crystalline precipitate.
4. A process for preparing a trilithium orthophosphate catalyst for the isomerization of propylene oxide to allyl alcohol, said catalyst having a lithium to phosphorus atomic ratio of from 3.1 to 3.3, which comprises:
   (a) mixing, within less than one minute, an aqueous solution of lithium hydroxide or a water-soluble lithium salt with an aqueous solution of sodium orthophosphate, potassium orthophosphate, ammonium orthophosphate or othophosphoric acid;
   (b) maintaining the pH of the resulting mixture between 12 and 14, and its temperature between 15° and 80° C., to precipitate said trilithium orthophosphate catalyst;
   (c) separating the precipitate thus formed from said mixture;
   (d) washing the precipitate with water; and
   (e) drying the fine crystalline precipitate.
5. A process for preparing a trilithium orthophosphate catalyst for the isomeriztaion of propylene oxide to ally catalyst for the isomeriztaion of propylene oxide to allyl alcohol, said catalyst having a lithium to phosphorus atomic ratio of from 3.1 to 3.3, which comprises:
   (a) mixing, within 10 to 40 seconds, an aqueous solution of lithium hydroxide, lithium nitrate, lithium sulfate, lithium chloride, lithium iodide, lithium chlorate, lithium perchlorate or lithium acetate, said solution having a concentration of from 2 to 6 gram atoms of Li per liter, with an aqueous solution of sodium orthophosphate, potassium orthophosphate, ammonium orthophosphate or orthophosphoric acid, the last-mentioned solution having a concentration of from 0.5 to 1.5 moles of $PO_4$ per liter;
   (b) maintaining the pH of the resulting mixture between 12 and 14, and its temperature between 15° and 80° C., to precipitate said trilithium orthophosphate catalyst;
   (c) separating the precipitate thus formed from said mixture;
   (d) washing the precipitate with water; and
   (e) drying the fine crystalline precipitate.

References Cited by the Examiner
UNITED STATES PATENTS

| | | | |
|---|---|---|---|
| 2,159,507 | 5/1929 | Law | 260—632 |
| 2,426,264 | 7/1947 | Fowler et al. | 260—632 |
| 2,986,585 | 5/1961 | Denton | 260—632 |

OSCAR R. VERTIZ, *Primary Examiner.*

MAURICE A. BRINDISI, BENJAMIN HENKIN,
*Examiners.*

R. M. DAVIDSON, A. GREIF, *Assistant Examiners.*